United States Patent [19]

Miller et al.

[11] Patent Number: 5,052,561
[45] Date of Patent: Oct. 1, 1991

[54] CRYSTALLINE SILICATE CATALYST AND A REFORMING PROCESS USING THE CATALYST

[75] Inventors: Stephen J. Miller, San Francisco; Bernie F. Mulaskey, Fairfax, both of Calif.

[73] Assignee: Chevron Research and Technology Company, San Francisco, Calif.

[21] Appl. No.: 496,119

[22] Filed: Mar. 19, 1990

Related U.S. Application Data

[63] Continuation of Ser. No. 398,816, Aug. 22, 1989, abandoned, which is a continuation of Ser. No. 97,789, Sep. 16, 1987, abandoned.

[51] Int. Cl.$^5$ .............................................. C10G 35/06
[52] U.S. Cl. .................................... 208/137; 208/134; 502/66; 585/417; 585/419

[58] Field of Search .................. 208/134, 137; 502/66; 585/417, 419

[56] References Cited

U.S. PATENT DOCUMENTS

| | | | |
|---|---|---|---|
| 4,347,394 | 8/1982 | Detz et al. | 208/138 |
| 4,362,653 | 12/1982 | Robinson | 502/64 |
| 4,387,258 | 6/1983 | Vadekar et al. | 502/62 |

Primary Examiner—William R. Dixon, Jr.
Assistant Examiner—Anthony J. Green
Attorney, Agent, or Firm—S. Russell La Paglia

[57] ABSTRACT

The preferred reforming catalyst has a high silica to alumina molar ratio and a small crystallite size. The reforming process using the catalyst is preferably run without added hydrogen, and at low pressures and temperatures.

25 Claims, 1 Drawing Sheet

CRYSTALLINE SILICATE CATALYST AND A REFORMING PROCESS USING THE CATALYST

This application is a continuation of Ser. No. 07/398,816, filed Aug. 22, 1989, which is a continuation of Ser. No. 07/097,789 filed Sept. 16, 1989 both now abandoned.

BACKGROUND OF THE INVENTION

The present invention relates to a crystalline silicate reforming catalyst and a process using the catalyst. More specifically, a combination of process conditions and improvements in the catalyst result in a low fouling rate.

Catalytic reforming is well known in the petroleum industry and refers to the treatment of naphtha fractions to improve the octane rating by the production of aromatics. The more important hydrocarbon reactions occurring during reforming include dehydrogenation of cyclohexanes to aromatics, dehydroisomerization of alkylcyclopentanes to aromatics, and dehydrocyclization of acyclic hydrocarbons to aromatics. A number of other reactions also occur, including the following: dealkylation of alkylbenzenes, isomerization of paraffins, and hydrocracking reactions which produce light gaseous hydrocarbons, e.g., methane, ethane, propane and butane. Hydrocracking reactions are to be particularly minimized during reforming as they decrease the yield of gasoline boiling products and hydrogen.

Because of the demand for high octane gasoline for use as motor fuels, etc., extensive research is being devoted to the development of improved reforming catalysts and catalytic reforming processes. Catalysts for successful reforming processes must possess good selectivity. That is, they must be able to produce high yields of liquid products in the gasoline boiling range which contain large concentrations of high octane aromatic hydrocarbons and low concentrations of light gaseous hydrocarbons. Also, the catalysts should possess good activity in order that the temperature required to produce a certain quality product need not be too high. It is also necessary that catalysts either possess good stability in order that the activity and selectivity characteristics can be retained during prolonged periods of operation, or be sufficiently regenerable to allow frequent regeneration without loss of performance.

Reforming catalysts are usually composed of a highly dispersed transition metal(s) on a metal oxide support. Typically, the transition metal is a noble metal, most notably platinum. However, there are numerous metal oxide supports. Examples are: silica, alumina, and a plethora of natural and man-made zeolites. Silicalite is one of those zeolites.

Silicalite is an intermediate pore zeolite and has a high silica:alumina ($SiO_2:AlO_3$) ratio. Examples of its methods of manufacture can be shown in: Dwyer et al, U.S. Pat. No. 3,941,871, issued Mar. 2, 1976 and U.S. Pat. No. 4,441,991, issued Apr. 10, 1984; and Derouane et al, EPO Application No. 186,479, published Feb. 7, 1986, all of which are incorporated by reference in their entirety.

Dwyer et al suggest that a platinum-loaded silicalite catalyst can be used in reforming hydrocarbons, as well as other types of reactions. The process conditions in Dwyer et al are listed as: a temperature between 700° F. and 1000° F.; a pressure between 100 psig and 1000 psig (preferably 200–700 psig); a liquid hourly space velocity (LHSV) between 0.1 and 10 (preferably between 0.5 and 4); and a hydrogen to hydrocarbon ($H_2/HC$) mole ratio between 1 and 20 (preferably 4 and 12). Detz et al, U.S. Pat. No. 4,347,394, issued Aug. 31, 1982, disclose a process for selectively producing benzene using a catalyst having platinum on an intermediate pore zeolite which is substantially free of acidity (such as silicalite). The process conditions can be: temperatures greater than 480° C. (more preferably at relatively high temperatures, such as between 510° C. and 595° C.); pressures of between atmospheric and 10 bar; an LHSV between 0.1 to 15; and hydrogen may or may not be added. P. Jacobs et al, "Comparison of Acid to Metal Catalyzed Conversion of N-decane and Cyclodecane on ZSM-5 and Faujasite-type Zeolites", J. Mol. Cat., 27, 11 (1984) show reacting a platinum silicalite catalyst with the test compounds n-decane and cyclodecane.

Reforming at low pressure in the absence of added hydrogen produces a relatively high liquid yield of relatively high octane reformate. Unfortunately, conventional catalysts foul quickly at these conditions which makes this operation impractical. Accordingly, the need has arisen for a reforming catalyst which has an acceptable run length under the conditions noted above.

SUMMARY OF THE INVENTION

The present invention is a reforming catalyst and a process for using the catalyst. The process comprises contacting a hydrocarbon feedstream with a catalyst which comprises at least one Group VIII metal and a crystalline silicate having a silica to alumina molar ratio of at least 500:1 and a crystallite size less than 10 microns. More preferably, the crystallite size is less than 5 microns, most preferably the crystallite size is less than 2 microns. Silicalite is the preferred crystalline silicate and platinum is the preferred Group VIII metal. It is also preferred that the silicalite catalyst have at least 80% crystallinity, more preferably at least 90% crystallinity, most preferably at least 95% crystallinity. Furthermore, the process is preferably run at temperatures between 599° F. and 1058° F., in the absence of added hydrogen, and at a pressure below 100 psig.

Among other factors it has been discovered that reforming using a crystalline silicate catalyst comprising small crystallites and a high degree of crystallinity results in surprisingly long run lengths in the reforming process. Also, when the crystalline silicate has small crystallites, it can run at lower pressures and temperatures without added hydrogen. A further advantage is that when hydrogen is not added and the reforming pressure is low, a high yield is achieved.

The process more specifically comprises contacting a hydrocarbon feedstream having less than 0.1 ppm sulfur with a silicalite reforming catalyst at a pressure of less than 100 psig, a temperature between 644° and 1004° F., and in the absence of added hydrogen; the reforming catalyst comprises platinum, silicalite having at least 90% crystallinity, a silica to alumina mole ratio of at least 1000:1 and a crystallite size of less than 5 microns and an alkali or alkaline earth metal. Preferably, at least 70 wt. % of the crystallites are less than 10 microns, more preferably at least 80 wt. % are less than 10 microns, most preferably at least 90 wt. % are less than 10 microns.

DETAILED DESCRIPTION OF THE INVENTION

Figure 1:
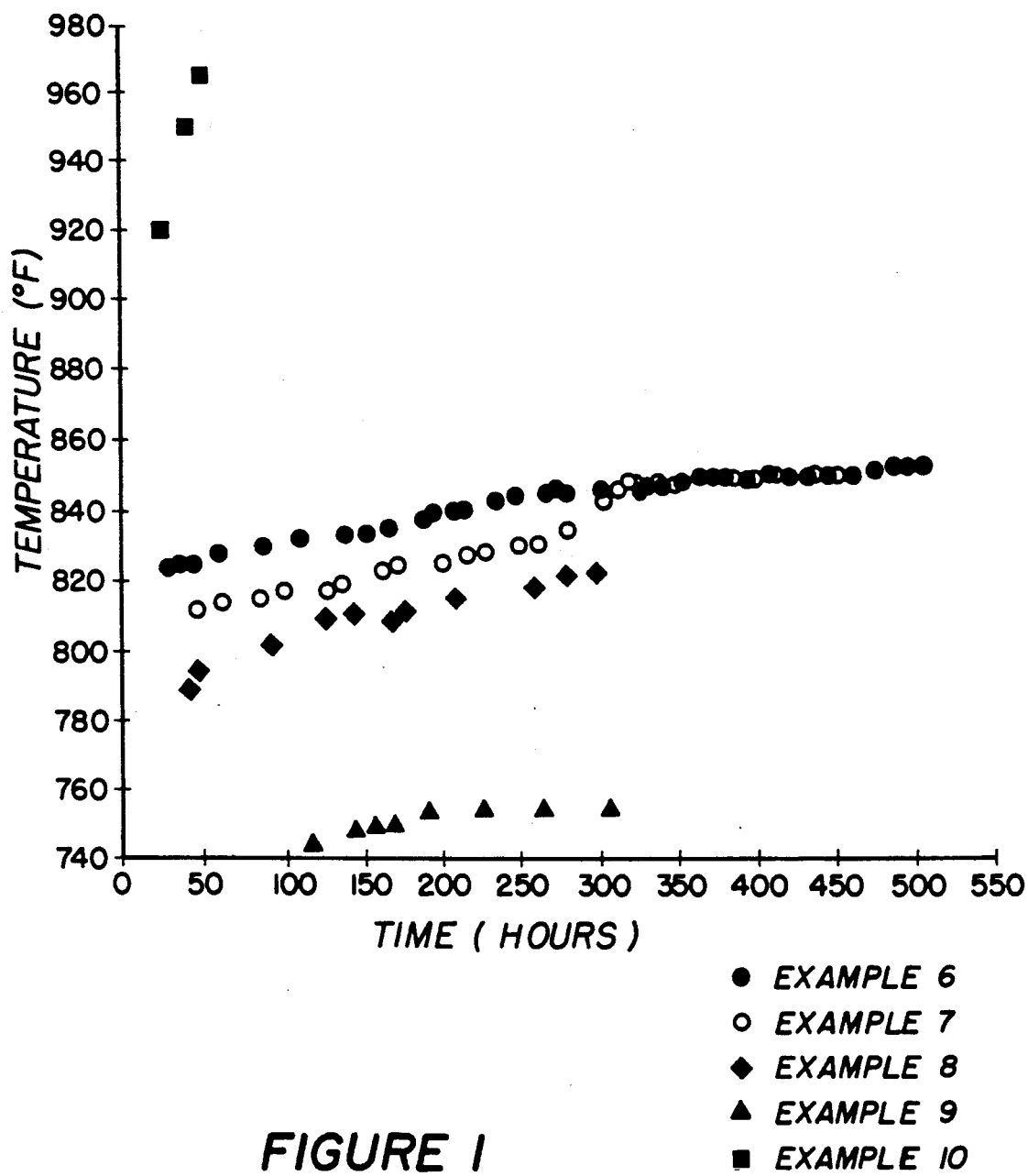
FIG. 1 is a graph showing the performance of different catalysts.

There are operating and economic advantages in obtaining longer, yield-stable run lengths from reforming catalysts. One way to attain this, is by improvements in the catalyst itself. I have found that when platinum is added to a crystalline silicate, such as silicalite, which has a small crystallite size, and a high degree of crystallinity, longer run lengths can be achieved.

Crystalline Silicates

The catalyst of the present invention contains a crystalline silicate. "Crystalline silicate" as used herein refers to silicates having rigid, three-dimensional network of $SiO_4$ tetrahedra in which the tetrahedra are cross-linked by the sharing of oxygen atoms. The crystalline silicates are substantially alumina-free, but they may contain minor amounts of alumina resulting from impurities in the starting materials or contamination of the reaction vessels. The preferred crystalline silicate is silicalite, examples of which are disclosed in U.S. Pat. No. 4,061,724 and U.S. Pat. No. Re. 29,948 which are hereby incorporated by reference in their entireties. The silica:alumina molar ratio of the crystalline silicates of the present invention are preferably greater than about 500:1, more preferably greater than about 1000:1 and most preferably greater than about 2000:1. The crystalline silicates also preferably have specific gravities, in the calcined form, between about 1.50 and about 2.10 g/cc and a refractive index between about 1.3 and about 1.5.

The following sets forth the relevant details and methods of manufacture for the preferred catalyst. As noted above, crystalline silicates which can be used in the process of the present invention have been reported in the literature. As synthesized, silicalite (U.S. Pat. No. 4,061,724) has a specific gravity at 77° F. of 1.99±0.05 g/cc as measured by water displacement. In the calcined form (1112° F. in air for one hour), silicalite has a specific gravity of 1.70±0.05 g/cc. With respect to the mean refractive index of silicalite crystals, values obtained by measurement of the as synthesized form and the calcined form (1112° F. in air for one hour) are, 1.48±0.01 and 1.39±0.01, respectively.

The X-ray powder diffraction pattern of silicalite (1112° F. calcination in air for one hour) has six strongest lines (i.e., interplanar spacings). They are set forth in Table A ("S"-strong, and "VS"-very strong):

TABLE A

| d-A | Relative Intensity |
|---|---|
| 11.1 ± 0.2 | VS |
| 10.0 ± 0.2 | VS |
| 3.85 ± 0.07 | VS |
| 3.82 ± 0.07 | S |
| 3.76 ± 0.05 | S |
| 3.72 ± 0.05 | S |

Table B shows the X-ray powder diffraction pattern of a typical silicalite composition containing 51.9 mols of $SiO_2$ per mol of tetrapropylammonium oxide $(TPA)_2O$, prepared according to the method of U.S. Pat. No. 4,061,724, and calcined in air at 1112° F. for one hour.

TABLE B

| d-A | Relative Intensity | d-A | Relative Intensity |
|---|---|---|---|
| 11.1 | 100 | 4.35 | 5 |
| 10.02 | 64 | 4.25 | 7 |
| 9.73 | 16 | 4.08 | 3 |
| 8.99 | 1 | 4.00 | 3 |
| 8.04 | 0.5 | 3.85 | 59 |
| 7.42 | 1 | 3.82 | 32 |
| 7.06 | 0.5 | 3.74 | 24 |
| 6.68 | 5 | 3.71 | 27 |
| 6.35 | 9 | 3.64 | 12 |
| 5.98 | 14 | 3.59 | 0.5 |
| 5.70 | 7 | 3.48 | 3 |
| 5.57 | 8 | 3.44 | 5 |
| 5.36 | 2 | 3.34 | 11 |
| 5.11 | 2 | 3.30 | 7 |
| 5.01 | 4 | 3.25 | 3 |
| 4.98 | 5 | 3.17 | 0.5 |
| 4.86 | 0.5 | 3.13 | 0.5 |
| 4.60 | 3 | 3.05 | 5 |
| 4.44 | 0.5 | 2.98 | 10 |

Silicalite crystals in both the "as synthesized" and calcined forms are generally orthorhombic and have the following unit cell parameters: a=20.05 Å, b=19.86 Å, c=13.36 Å (all values ±0.1 Å).

The pore diameter of silicalite is about 6Å and its pore volume is 0.18 cc/gram as determined by adsorption. Silicalite adsorbs neopentane (6.2 Å kinetic diameter) slowly at ambient room temperature. The uniform pore structure imparts size-selective molecular sieve properties to the composition, and the pore size permits separation of p-xylene from o-xylene, m-xylene and ethylbenzene as well as separations of compounds having quaternary carbon atoms from those having carbon-to-carbon linkages of lower value (e.g. normal and slightly branched paraffins).

The crystalline silicates of U.S. Pat. No. Re. 29,948 are disclosed as having a composition, in the anhydrous state:

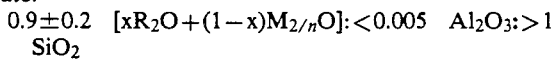

$$0.9 \pm 0.2 \ [xR_2O + (1-x)M_{2/n}O]: <0.005 \ Al_2O_3: >1 \ SiO_2$$

where M is a metal, other than a metal of Group IIIA, n is the valence of said metal, R is an alkyl ammonium radical and x is a number greater than 0 but not exceeding 1. The crystalline silicate is characterized by the X-ray diffraction pattern of Table C.

TABLE C

| Interplanar Spacing d(A) | Relative Intensity |
|---|---|
| 11.1 | S |
| 10.0 | S |
| 7.4 | W |
| 7.1 | W |
| 6.3 | W |
| 6.4 | |
| 5.97 | W |
| 5.56 | W |
| 5.01 | W |
| 4.60 | W |
| 4.25 | W |
| 3.85 | VS |
| 3.71 | S |
| 3.04 | W |
| 2.99 | W |
| 2.94 | W |

The following discloses crystalline silicates that are related to silicalite. The crystalline silicate polymorph of U.S. Pat. No. 4,073,865 is disclosed as having a specific gravity of 1.70 ±0.05 g/cc and a mean refractive index of 1.39 ±0.01 after calcination in air at 600° C., as prepared by a hydrothermal process in which fluoride anions are included in the reaction mixture. The crystals, which can be as large as 200 microns, exhibit a substantial absence of infrared adsorption in the hydroxyl-stretching region and also exhibit an exceptional degree of hydrophobicity. They exhibit the X-ray diffraction pattern of Table D.

| d(A) | Intensity |
|------|-----------|
| 11.14 | 91 |
| 10.01 | 100 |
| 9.75 | 17 |
| 8.99 | 1 |
| 8.01 | 0.5 |
| 7.44 | 0.5 |
| 7.08 | 0.2 |
| 6.69 | 4 |
| 6.36 | 6 |
| 5.99 | 10 |
| 5.71 | 5 |
| 5.57 | 5 |
| 5.37 | 1 |
| 5.33 | 1 |
| 5.21 | 0.3 |
| 5.12 | 1.5 |
| 5.02 | 3 |
| 4.97 | 6 |
| 4.92 | 0.6 |
| 4.72 | 0.5 |
| 4.62 | 2 |
| 4.47 | 0.6 |
| 4.36 | 3 |
| 4.25 | 4 |
| 4.13 | 0.5 |
| 4.08 | 1.5 |
| 4.00 | 3 |
| 3.85 | 44 |
| 3.82 | 25 |
| 3.71 | 21 |
| 3.65 | 5 |
| 3.62 | 5 |
| 3.59 | 1 |
| 3.48 | 1.5 |
| 3.45 | 3 |
| 3.44 | 3 |
| 3.35 | 3 |
| 3.31 | 5 |
| 3.25 | 1.5 |
| 3.23 | 0.8 |
| 3.22 | 0.5 |

The literature also describes other crystalline silicates and their method of preparation. The following method discloses the preparation of the crystalline silicate called "silicalite-2" (Nature, August, 1979):

The silicalite-2 precursor is prepared using tetra-n-butylammonium hydroxide only, although adding ammonium hydroxide or hydrazine hydrate as a source of extra hydroxyl ions increases the reaction rate considerably. It is stable at extended reaction times in a hydrothermal system. A successful preparation is to mix 8.5 mol $SiO_2$ as silicic acid (74% $SiO_2$), 1.0 mol tetra-n-butylammonium hydroxide, 3.0 mol $NH_4OH$ and 100 mol water in a steel bomb and heat at 338° F. for 3 days. The precursor crystals will be ovate in shape, approximately 2-3 micromillimeters long and 1-1.5 micromillimeters in diameter. It is reported that the silicalite-2 precursor will not form if Li, Na, K, Rb or Cs ions will be present, in which case the precursor of the U.S. Pat. No. 4,061,724 silicalite is formed. It is also reported that the size of the tetraalkylammonium ion is critical because replacement of the tetra-n-butylammonium hydroxide by other quaternary ammonium hydroxides (such as tetraethyl, tetrapropyl, triethylpropyl, and triethylbutyl hydroxides) will result in amorphous products. The amount of Al present in silicalite-2 depends on the purity of the starting materials and is reported as being less than 5 ppm. The precursor contains occluded tetraalkylammonium salts which, because of their size, are removed only by thermal decomposition. Thermal analysis and mass spectrometry show that the tetraalkylammonium ion decomposes at approximately 572° F. and is lost as the tertiary amine, alkene and water. This is in contrast to the normal thermal decomposition at 392° F. of the same tetraalkylammonium salt in air.

The Nature article further reports that the major differences between the patterns of silicalite and silicalite-2 are that peaks at 9.06, 13.9, 15.5, 16.5, 20.8, 21.7, 22.1, 24.4, 26.6 and 27.0 degrees 2θ (CuK alpha radiation) in the silicalite X-ray diffraction pattern are absent from the silicalite-2 pattern. Also, peaks at 8.8, 14.8, 17.6, 23.1, 23.9 and 29.9 degrees are singlets in the silicalite-2 pattern rather than doublets as in the silicalite pattern. These differences are reported as being the same as those found between the diffraction patterns of the aluminosilicalites, orthorhombic ZSM-5 and tetragonal ZSM-11. Unit cell dimensions reported as calculated on the assumption of tetragonal symmetry for silicalite-2 are a=20.04; b=20.04; c=13.38. The measured densities and refractive indices of silicalite-2 and its precursor are reported as 1.82 and 1.98 g/cc and 1.41 and 1.48 respectively.

Preparation of Crystalline Silicates

The preparation of crystalline silicates of the present invention generally involves the hydrothermal crystallization of a reaction mixture comprising water, a source of silica and an organic templating compound at a pH of 10 to 14. Representative templating moieties include quaternary cations such as $XR_4$ where X is phosphorous or nitrogen and R is an alkyl radical containing from 2 to 6 carbon atoms, e.g., tetrapropylammonium hydroxide (TPA-OH) or halide, as well as alkyl hydroxyalkyl compounds, organic amines and diamines, and heterocycles such as pyrrolidine.

When the organic templating compound (i.e., TPA-OH) is provided to the system in the hydroxide form in sufficient quantity to establish a basicity equivalent to the pH of 10 to 14, the reaction mixture need contain only water and a reactive form of silica as additional ingredients. In those cases in which the pH must be increased to above 10, ammonium hydroxide or alkali metal hydroxides can be suitably employed for that purpose, particularly the hydroxides of lithium, sodium, and potassium. The ratio $$\frac{R^+}{R^+ + M^+},$$

where $R^+$ is the concentration of organic templating cation and $M^+$ is the concentration of alkali metal cation, is preferably between 0.7 and 0.98, more preferably between 0.8 and 0.98, most preferably between 0.85 and 0.98.

The source of silica in the reaction mixture can be wholly, or in part, alkali metal silicate but should not be employed in amounts greater than that which would change the molar ratio of alkali metal to organic templating compound set forth above. Other silica sources include solid reactive amorphous silica, e.g., fume silica, silica sols, silica gel, and organic orthosilicates. One commercial silica source is Ludox AS-30 available from Du Pont.

Aluminum is easily incorporated as an impurity into the crystalline silicate, so, care should be exercised in selecting the silica source to minimize alumina uptake. Commercially available silica sols can typically contain between 500 and 700 ppm $Al_2O_3$, whereas fume silicas can contain between 80 and 2000 ppm of $Al_2O_3$ impurity. As explained above, the silica to alumina molar ratio in the crystalline silicate is preferably greater than 500:1, more preferably greater than 1000:1, most preferably 2000:1. Aluminum in the synthesis contributes acidity to the catalyst, which is undesirable.

The quantity of silica in the reaction system is preferably between about 1 and 10 mols $SiO_2$ per mol-ion of the organic templating compound. Water should be generally present in an amount between 20 and 700 mol per molion of the quaternary cation. The reaction preferably occurs in an aluminum-free reaction vessel which is resistant to alkali or base attack, e.g., Teflon.

Strong acidity is undesirable in the catalyst because it promotes cracking, resulting in lower selectivity. To reduce acidity, the catalyst preferably contains an alkali metal and/or an alkaline earth metal. The alkali or alkaline earth metals are preferably incorporated into the catalyst during or after silicalite synthesis. Preferably, at least 90% of the acid sites are neutralized by introduction of the metals, more preferably at least 95%, most preferably at least 100%.

Crystalline silicates are conventionally synthesized largely in the sodium or potassium form. These cations are exchangeable, so that a given silicalite can be used to obtain silicalites containing other cations, such as alkaline earth metals or other alkali metals, by subjecting the silicalite to ion exchange treatment in an aqueous solution of appropriate salts. The preferred alkali and/or alkaline earth metals are: lithium; sodium; potassium; rubidium; cesium; strontium; and barium; more preferred metals are: sodium, potassium; rubidium; and cesium.

The crystalline silicate is preferably bound with a matrix or porous matrix. The terms "matrix" and "porous matrix" include inorganic compositions with which the silicate can be combined, dispersed, or otherwise intimately admixed. Preferably, the matrix is not catalytically active in a hydrocarbon cracking sense, i.e., contains substantially no acid sites. The matrix porosity can either be inherent or it can be caused by a mechanical or chemical means. Satisfactory matrices include pumice, firebrick, diatomaceous earth and inorganic oxides. Preferred inorganic oxides include alumina, silica, naturally occurring and conventionally processed clays, for example bentonite, kaolin, sepiolite, attapulgite, and halloysite. The preferred matrices have few, if any, acid sites and therefore have little or no cracking activity. Silica or alumina are especially preferred. The use of a non-acidic matrix is preferred to maximize aromatics production.

Compositing the crystalline silicate with an inorganic oxide matrix can be achieved by any suitable known method wherein the silicate is intimately admixed with the oxide while the latter is in a hydrous state (for example, as a hydrous salt, hydrogel, wet gelatinous precipitate, or in a dried state, or combinations thereof). A convenient method is to prepare a hydrous mono or plural oxide gel or cogel using an aqueous solution of a salt or mixture of salts (for example aluminum sulfate and sodium silicate). Ammonium hydroxide carbonate (or a similar base) is added to the solution in an amount sufficient to precipitate the oxides in hydrous form. Then, the precipitate is washed to remove most of any water soluble salts and it is thoroughly admixed with the silicate which is in a finely divided state. Water or a lubricating agent can be added in an amount sufficient to facilitate shaping of the mix (as by extrusion).

The preferred crystalline silicate is silicalite. Assuming that the only crystalline phase in the silicalite prep is silicalite, the silicalite preferably has a percent crystallinity of at least 80%, more preferably at least 90%, most preferably at least 95%. To determine percent crystallinity, an X-ray diffraction (XRD) pattern of the silicalite is made and the area under the 8 major peaks is measured in the angle interval between 20.5 and 25.0 degrees. Once the area under the curve is calculated, it is compared with the area under the curve for a 100% crystalline standard for silicalite.

The preferred crystallite size of the crystalline silicate is less than 10 microns, more preferably less than 5 microns, most preferably less than 2 microns. When a crystallite size is specified, preferably at least 70 wt. % of the crystallites are that size, more preferably at least 80 wt. %, more preferably 90 wt. %. Crystallite size can be controlled by adjusting synthesis conditions, as known to the art. These conditions include temperature, pH, and the mole ratios $H_2O/SiO_2$, $R^{30}/SiO_2$, and $M^+/SiO_2$ where $R^+$ is the organic templating cation and $M^+$ an alkali metal cation. For small crystallite size, i.e., less than 10 microns, typical synthesis conditions are listed below:

| | Preferred | More Preferred | Most Preferred |
|---|---|---|---|
| Temperature, °F. | 176–392 | 144–356 | 212–302 |
| pH | 12–14 | 12.5–14 | 13–13.5 |
| $H_2O/SiO_2$ | 5–100 | 10–50 | 10–40 |
| $R^+/SiO_2$ | 0.1–1.0 | 0.1–0.5 | 0.2–0.5 |
| $M^+/SiO_2$ | 0.01–0.3 | 0.01–0.15 | 0.01–0.08 |

Other techniques known to the art, such as seeding with silicate crystals, can be used to reduce crystallite size.

Group VIII Metals

The catalysts according to the present invention contain one or more Group VIII metals, e.g., nickel, ruthenium, rhodium, palladium, iridium or platinum. The preferred Group VIII metals are iridium, palladium, and particularly platinum. They are more selective with regard to dehydrocyclization and are also more stable under the dehydrocyclization reaction conditions than other Group VIII metals. The preferred percentage of the Group VIII metal, such as platinum, in the catalyst is between 0.1 wt. % and 5 wt. %, more preferably from 0.3 wt. % to 2.5 wt. %.

Group VIII metals are preferably introduced into the crystalline silicate by impregnation, occlusion, or exchange in an aqueous solution or exchange in an aqueous solution of an appropriate salt. When it is desired to introduce two Group VIII metals into the crystalline silicate, the operation may be carried out simultaneously or sequentially. Preferably, the Group VIII metal is finely dispersed within, and on, the crystalline silicate.

By way of example, platinum can be introduced by impregnation with an aqueous solution of tetraammineplatinum (II) nitrate, tetraammineplatinum (II) hydroxide, dinitrodiamino-platinum or tetraammineplatinum (II) chloride. In an ion exchange process, platinum can be introduced by using cationic platinum complexes such as tetraammineplatinum (II) nitrate. When platinum is introduced into the silicalite by occlusion a platinum complex is preferably introduced into the crystalline silicate during its formation.

After the desired metal or metals have been introduced, the catalyst is preferably treated in air, or air diluted with an inert gas, and reduced in hydrogen. Catalysts containing platinum are typically subjected to halogen or halide treatments to achieve or maintain a uniform metal dispersion. Typically, the halide is a chloride compound. The catalysts of our invention can be subjected to similar treatments although the preferred catalyst does not contain chloride in the final form.

Other metals can be added to the catalyst. These metals are preferably selected from Groups VIII, IVA, IB or VIB. More preferably, additional metals may include: rhenium, tin, gold, or chromium.

Reforming and Dehydrocyclizing

Once the Group VIII metal has been deposited on the catalyst, it can be employed in any of the conventional types of equipment known to the art. It may be employed in the form of pills, pellets, granules, broken fragments, or various special shapes, disposed as a fixed bed within a reaction zone, and the charging stock may be passed therethrough in the liquid, vapor, or mixed phase, and in either upward, downward, or radial flow. Alternatively, it may be prepared for use in moving beds, or in fluidized-solid processes, in which the charging stock is passed upward through a turbulent bed of finely divided catalyst. However, in view of the danger of attrition losses of the valuable catalyst and of well-known operational advantages either a fixed bed system or a densephase moving bed system are preferred. In a fixed bed system, the feed is preheated (by any suitable heating means) to the desired reaction temperature and then passed into a dehydrocyclization zone containing a fixed bed of the catalyst. This dehydrocyclization zone may be one or more separate reactors with suitable means to maintain the desired temperature at the entrance to each reactor. The temperature must be maintained because the dehydrocyclization reaction is endothermic in nature. Afterward, the reaction products from any of the foregoing processes are separated from the catalyst, vented to atmospheric pressure, and fractionated to recover the various components thereof.

The feed to the reformer is preferably a naphtha fraction, boiling within the range of 70° to 550° F. and preferably from 120° to 400° F. This can include, for example, straight run naphthas, paraffinic raffinates from aromatic extraction or adsorption, and $C_6$–$C_{10}$ paraffin-rich feeds, as well as paraffin-containing naphtha products from other refinery processes, such as hydrocracking or conventional reforming. The actual reforming conditions will depend in large measure on the feed used, whether highly aromatic, paraffinic or naphthenic and upon the desired octane rating of the product. Furthermore, the temperature and pressure can be correlated with the liquid hourly space velocity (LHSV) to favor any particularly desirable reforming reaction as, for example, aromatization, isomerization or dehydrogenation. The catalyst of the present invention is preferably used to dehydrocyclize acyclic hydrocarbons to form aromatics.

The reforming process is preferably conducted in the absence of added hydrogen. The absence of added hydrogen favors aromatics formation and increases liquid yield at a given octane.

A low sulfur feed is especially preferred in the present process. The feed preferably contains less than 10 ppm, more preferably less than 1 ppm, and most preferably less than 0.1 ppm sulfur. In the case of a feed which is not already low in sulfur acceptable levels can be reached by hydrogenating the feed in a presaturation zone with a hydrogenating catalyst which is resistant to sulfur poisoning. An example of a suitable catalyst for this hydrodesulfurization process is an alumina-containing support and a minor catalytic proportion of molybdenum oxide, cobalt oxide and/or nickel oxide. A platinum on alumina hydrogenating catalyst can also work. A sulfur sorber is preferably placed downstream of the hydrogenating catalyst, but upstream of the silicalite reforming catalyst. Examples of sulfur sorbers are alkali or alkaline earth metals on porous refractory inorganic oxides, zinc, etc. Hydrodesulfurization is typically conducted at 599° F. to 951° F., at 200 to 2000 psig, and at a liquid hourly space velocity of 1 to 5.

It is also preferable to limit the nitrogen level in the feed to less than 10 ppm nitrogen, or more preferably less than 1 ppm. Preferably, water in the feed is limited to less than 100 ppm $H_2O$, more preferably less than 10 ppm $H_2O$. Catalysts and processes which are suitable for these purposes are known to those skilled in the art.

In the process of the present invention, the pressure is preferably between 0 psig and 200 psig, more preferably between 0 and 100 psig, and most preferably between 25 psig and 75 psig. The liquid hourly space velocity (LHSV) is preferably between about 0.1 to about 10 hr.$^{-1}$ with a value in the range of about 0.3 to about 5 hr.$^{-1}$ being preferred. The temperature is preferably between about 599° F. and about 1058° F., more preferably between 644° F. and 1004° F. As is well known to those skilled in the dehydrocyclization art, the initial selection of the temperature within this broad range is made primarily as a function of the desired conversion level of the acyclic hydrocarbon considering the characteristics of the feed and of the catalyst. Thereafter, to provide a relatively constant value for conversion, the temperature is slowly increased during the run to compensate for the inevitable deactivation that occurs.

After a period of operation the catalyst can become deactivated by sulfur or coke. Sulfur and coke can be removed by contacting the catalyst with an oxygen-containing gas at an elevated temperature. If the Group VIII metal(s) have agglomerated, then it can be redispersed by contacting the catalyst with a chlorine gas under conditions effective to redisperse the metal(s). The method of regenerating the catalyst will depend on whether there is a fixed bed, moving bed, or fluidized bed operation. Regeneration methods and conditions are well known in the art. An example of an oxychlorination regeneration procedure is shown in U.S. Ser. No. 944,403 which is hereby incorporated by reference in its entirety. An example of a sulfur removal procedure is shown in U.S. Ser. No. 944,392 which is hereby incorporated by reference in its entirety.

The present invention will be more fully understood by reference to the following examples. They are intended to be purely exemplary and are not intended to limit the scope of the invention in any way.

EXAMPLES

Example 1

A Pt-occluded silicalite catalyst was made as follows: 4.6 grams $NaNO_3$, 10.0 grams EDTA, and 1.0 grams $Pt(NH_3)_4 (NO_3)_2$ were mixed into 20 cc of distilled water. This mixture was added to 200 grams of a 25% aqueous solution of TPA-OH with rapid stirring, and stirred an additional 10 minutes. 160 Grams of Ludox AS-30 were then added with rapid stirring and stirred for an additional 15 minutes. The pH of the mixture was reduced to 11.0 using HCl. The mixture was placed in a Teflon bottle in an autoclave under autogeneous pressure at 150° C. for three days. The product was filtered, dried overnight in a vacuum oven at 110° C., and calcined for 8 hours in dry air at 454° C. The sieve was identified as silicalite by X-ray diffraction analysis. The average crystallite size was about $40 \times 15 \times 15$ microns (roughly rectangular) as determined by scanning election microscopy. The percent silicalite was determined by X-ray diffraction (XRD) analysis to be 100%. The Pt content was 0.6 wt. %.

EXAMPLE 2

A Pt-occluded silicalite was prepared as follows 9.2 grams of $NaNO_3$, 20 grams of EDTA, and 2.0 grams $Pt(NH_3)_4 (NO_3)_2$ were mixed into 40 ml of distilled water in a polyethylene beaker. Four hundred (400) grams of a 25% aqueous solution of TPA-OH were added and the mixture stirred well for 15 minutes. Three hundred twenty (320) grams of Ludox AS-30 were added with rapid stirring and the mixture stirred an additional 15 minutes. The pH of the mixture was 13.2. The mixture was poured into a Teflon bottle and kept at 100° C. for 7 days. The product was filtered, dried overnight in a vacuum oven at 120° C., and then calcined in dry air at 454° C. The average crystallite size was about 0.5 microns in diameter (roughly spherical). The Pt content was 0.6 wt. %. The Al content was 397 ppm. Na was 0.68 wt %.

EXAMPLE 3

The catalysts of Examples 1 and 2 were tested for conversion of n-hexane to benzene under various conditions. The results in Table I show that the catalyst having 0.5 microns crystallites is more selective for benzene than the catalyst having $40 \times 15 \times 15$ crystallites.

TABLE I

| Conversion of N-Hexane over 0.6% Pt (occ)/Silicalite at 1 LHSV | | | | |
|---|---|---|---|---|
| Silicalite, microns | $40 \times 15 \times 15$ | 0.5 | $40 \times 15 \times 15$ | 0.5 |
| Pressure, psig | 100 | 100 | 100 | 100 |
| Temperature, °F. | 980 | 980 | 950 | 950 |
| Gas | $H_2$ | $H_2$ | $N_2$ | $N_2$ |
| Gas/HC | 4 | 4 | 7 | 7 |
| Product, Wt. % | | | | |
| $C_1$ | 10.0 | 11.2 | 0.9 | 17.8 |
| $C_2$ | 19.8 | 15.3 | 1.5 | 14.1 |
| $C_3-C_4$ | 39.9 | 37.6 | 4.4 | 7.6 |
| $C_5+$ | 30.3 | 35.9 | 93.2 | 60.5 |
| Benzene | 23.9 | 25.9 | 17.0 | 56.8 |
| MCP | 0 | 0.1 | 6.2 | 0 |
| $C_6$ Paraffins + Olefins | 0.3 | 1.5 | 65.4 | 0 |
| Wt. % Selectivity to Benzene from $C_6$ Paraffins and Olefins | 24.0 | 26.3 | 49.1 | 56.8 |

EXAMPLE 4

The catalyst of Example 2 was used to reform a light straight run naphtha feed (Table II) at 875° F., 100 psig, 1 LHSV, and 7 $N_2$/HC. Throughout the 140-hour run the benzene yield was 22-25 wt. % at about 85 wt. % $C_5+$yield. The toluene yield was 11-12 wt. %.

At the 140-hour point, $N_2$ flow was stopped and replaced by $H_2$ at the same rate. The benzene yield dropped within four hours to 8.7 wt. %.

The product properties in Table III, show that the catalyst is quite selective for conversion of low octane normal paraffins. The research octane number was increased from 71.7 to 92.1.

TABLE II

| Light Straight Run Naphtha | |
|---|---|
| Gravity, °API | 70.7 |
| Sulfur, ppm | <0.05 |
| Octane, RON/MON | 71.7/69.7 |
| P/N/A, LV % | 60.3/35.0/4.7 |
| Composition, LV % | |
| $C_5$ | 19.7 |
| $C_6$ | 41.9 |
| $C_7$ | 30.5 |
| $C_8$ | 7.6 |
| $C_9$ | 0.3 |
| D86 Distillation, LV %, °F. | |
| ST/5 | 109/130 |
| 10/30 | 134/147 |
| 50 | 160 |
| 70/90 | 178/205 |
| 95/EP | 230/248 |

EXAMPLE 5

A catalyst identical to that of Example 2 was prepared, with the exception that it contained 0.8 wt % Pt. This catalyst was used to reform the feed of Table II at 875° F. 0 pig, 1 LHSV, and no diluent gas. During a 20hour period, the benzene yield was 30 et % at a $C_5+$yield of about 76 wt. %. At the 20-hour point, the reactor temperature was lowered to 850° F. and the pressure was increased to 100 psig. Over the next 72 hours, the benzene yield was about 24-25 wt. %. The product properties at these conditions are shown in Table III.

TABLE III

| Reforming Light Straight Run Naphtha over Pt/Sil | | | |
|---|---|---|---|
|  | Feed | Ex. 4 (0-140 hrs.) | Ex. 5 (20-72 hrs.) |
| Temperature, °F. |  | 875 | 850 |
| $N_2$/HC |  | 7 | 0 |
| Pressure (psig) |  | 100 | 100 |
| LHSV |  | 1 | 1 |
| $C_5+$, LV % |  | 84 | 71 |
| $H_2$, SCF/bbl |  | 400 |  |
| $H_2/CH_4$ |  | 1.2 |  |
| $C_5+$ Composition, LV % |  |  |  |
| P/O/ | 60.3/0/ | 49.1/4.8/ | 50.0/2.8/ |
| N/A | 35.0/4.7 | 18.8/27.3 | 9.0/38.2 |
| $nC_5$ | 12.0 | 14.6 | 16.3 |
| $nC_6$ | 12.3 | 1.9 | 2.2 |
| $nC_7$ | 5.0 | 0.5 | 0.2 |
| $C_6P$ Conversion, % |  |  |  |
| $nC_6$ |  | 87 | 87 |
| $2MC_5$ |  | 15 | 48 |
| $3MC_5$ |  | 5 | 39 |
| Octanes, RON/MON | 71.7/69.7 | 92.1/81.0 | 92.3/83.8 |

EXAMPLE 6

A Pt-occluded silicalite catalyst was prepared as follows: 18.4 grams of $NaNO_3$, 40 grams of EDTA, and 4.0 grams of $Pt(NH_2)_4(NO_3)_2$ were mixed into 80 ml of distilled water. Eight hundred (800) grams of a 25% aqueous solution of TPA-OH were added and mixed well for 15 minutes. Six hundred forty (640) grams of Ludox AS-30 were added with rapid stirring and stirred an additional 15 minutes. The pH of the mixture was 12.9. This was raised to 13.2 by the addition of about 5 ml of a 50% aqueous solution of NaOH. The mixture was poured into a Teflon bottle and kept at 100° C. for 7 days. The product was filtered and then dried overnight in a vacuum oven at 100° C. It was then calcined at 232° C. for 4 hours, 371° C. for 2 hours, and finally 454° C. for 4 hours. The catalyst contained 0.85% Pt, 1.17% Na, and 433 ppm Al. The average crystallite size was about 0.9 microns in diameter (roughly spherical). The percent silicalite was determined by XRD analysis to be 91%.

EXAMPLE 7

A Pt-impregnated silicalite catalyst was made as follows: 9.2 grams of $NaNO_3$ and 20.0 grams of EDTA were mixed into 40 ml of distilled water. To this were added 400 grams of a 25% aqueous solution of TPA-OH and mixed well for 15 minutes. Three hundred twenty (320) grams of Ludox AS-30 were then added with rapid stirring, and the mixture stirred for an additional 15 minutes. The pH of the mixture was 13.2. The mixture was poured into a Teflon bottle and kept at 100° C. for 7 days. The product was filtered, and then dried overnight in a vacuum oven at 120° C. It was then calcined for 8 hours at 427° C. and another 8 hours at 566° C. The percent silicalite was 99% as determined by XRD analysis. The sieve, which had an average crystallite size of about 0.8 microns in diameter (roughly spherical), was then impregnated with 0.8% Pt by the pore-fill method using an aqueous solution of $Pt(NH_3)_4(NO_3)_2$. The catalyst was then dried overnight in a vacuum oven at 110° C. and calcined in air for 4 hours at 232° C. and 8 hours at 454° C.

EXAMPLE 8

A platinum-impregnated silicalite catalyst was prepared as follows: 8.4 grams of $NaNO_3$ and 40 grams of EDTA were mixed into 80 ml of distilled water. Eight hundred (800) grams of a 25% aqueous solution of TPA-OH were added and mixed well for 15 minutes. Six hundred forty (640) grams of Ludox AS-30 were added and mixed with rapid stirring for 15 minutes. The pH of the mixture was 13.1. The mixture was poured into a Teflon bottle and kept at 100° C. for 7 days. The product was filtered and then dried overnight in a vacuum oven at 120° C. It was then calcined for 8 hours at 566° C. in air. The percent silicalite was 100% as measured by XRD analysis. The sieve, which had an average crystallite size of about one micron in diameter (roughly spherical), was then impregnated with 0.8 wt. % platinum by the pore-fill method using an aqueous solution of $Pt(NH_3)_4(NO_3)_2$. The catalyst was then dried overnight in a vacuum oven at 120° C. and calcined in dry air for 4 hours at 204° C., 4 hours at 288° C., 4 hours at 371° C., and 4 hours at 427° C.

EXAMPLE 9

The catalyst of Example 8 was exchanged once with a 5 wt. % aqueous solution of $KNO_3$ at 82° C. for 2 hours. It was then filtered, washed with distilled water, and dried overnight in a vacuum oven at 120° C. The catalyst was then calcined in dry air for 4 hours at 204° C. and 4 hours at 288° C. The $K^+$ level of the catalyst was 0.69 wt. %. $Na^+$ was 239 ppm.

EXAMPLE 10

A large crystal, platinum-impregnated silicalite catalyst was prepared as follows: 6.25 grams of NaOH was dissolved in 400 grams of distilled water. Then, 41.25 grams of tetrapropylammonium bromide was added and mixed well. Next, 200 grams of Ludox AS-30 were added with rapid stirring. HCl was added to half of this mixture to reduce the pH to 11.0 and it was poured into a Teflon bottle and kept at 150° C. for 4 days. It was filtered, then dried overnight in a vacuum oven, and then calcined for 8 hours at 566° C. in air. The silicalite was identified as 100% silicalite as determined by XRD analysis. It had an $SiO_2/Al_2O_3$ ratio of about 2000 and 0.16% Na. Its size was about $30 \times 10 \times 10$ microns. It was impregnated with platinum, dried, and calcined by the same procedure as used with the catalyst of Example 8.

EXAMPLE 11

The catalysts of Examples 6–10 were used to reform the light straight naphtha feed of Table II at 52 psig, 1 LHSV, and no diluent gas. The reactor temperature was adjusted to maintain an $n-C_6$ conversion of 60%. Plots of reactor temperature versus time are shown in FIG. 1.

EXAMPLE 12

A platinum-occluded silicalite catalyst was made as follows: 18.4 grams of $NaNO_3$, 40 grams of EDTA, and 4 grams of $Pt(NH_3)_4(NO_3)_2$ were dissolved in 80 ml of distilled water. This solution was added with stirring to 800 grams of a 25% aqueous solution of TPA hydroxide in a polyethylene beaker and stirred for 15 minutes. 640 grams of Ludox AS-30 were added with rapid stirring and stirred for an additional 15 minutes. The pH of the mixture was 13.1.

The mixture was poured into a Teflon bottle and placed in an oven for 24 hours at 70° C. The temperature was then raised to 100° C. and held there for 6 more days. The product was collected by both filtration and centrifugation. It was water washed and dried for three days in a vacuum oven at 90° C. It was then calcined in dry air for 8 hours at 454° C. The percent silicalite as determined by X-ray diffraction analysis was 74%. The Pt content was 0.80 wt. %. The average crystallite size was about 0.2 microns.

EXAMPLE 13

The catalyst of Example 12 was used to reform the light straight run naphtha feed of Table II at the same conditions as in Example 11. At 24 hours onstream, a temperature of 870° F. was required for 60% $n-C_6$ conversion, considerably higher than with a catalyst of greater than 90% crystallinity (i.e., Examples 6–9).

The foregoing disclosure has taught some specific examples of the present invention. However, there are many modifications and variations within the spirit of the disclosure. It is intended that the embodiments are only illustrative and not restrictive, reference being made to the following claims to indicate the scope of the invention.

What is claimed is:

1. A process for reforming a hydrocarbon feed stream to maintain production of aromatic hydrocarbons over a prolonged period of operations comprising, contacting a hydrocarbon feedstream having less than about 1.0 ppm sulfur at a pressure of less than 100 psig and a temperature between about 599° and about 1058° F., and a molar ratio of added hydrogen to said hydrocarbon feedstream of not greater than about 1.0 with a catalyst comprising a platinum, an alkali or alkaline earth metal, and silicalite, which silicalite has at least about 80% crystallites; a silica to alumina molar ratio of at least about 1000:1, and in which the size of at least about 80 wt. % of said crystallites is less than 5 microns.

2. A process for reforming in accordance with claim 1 wherein the size of said crystallites is less than about 2 microns.

3. A process for reforming in accordance with claim 1 wherein the said silicalite is at least about 90% crystalline.

4. A process for reforming in accordance with claim 1 wherein said silicalite is at least about 95% crystalline.

5. A process for reforming in accordance with claim 1 wherein said alkali or alkaline earth metal is selected from the group consisting of sodium, potassium, rubidium, or cesium.

6. A process in accordance with claim 5 wherein said alkali or alkaline earth metal is in an amount sufficient to neutralize at least 90% of the acid sites of said catalyst.

7. A process in accordance with claim 6 wherein said alkali or alkaline earth metal is in an amount sufficient to neutralize at least 95% of the acid sites of said catalyst.

8. A process in accordance with claim 7 wherein said alkali or alkalien earth metal is in an amount sufficient to neutralize at least 100% of the acid sites of said catalyst.

9. A process for reforming in accordance with claim 1 wherein the silicalite is impregnated with platinum.

10. A process in accordance with claim 9 wherein said platinum is from 0.1 to 5.0 wt % of said catalyst.

11. A process in accordance with claim 9 wherein said platinum is from 0.3 to 2.5 wt % of said catalyst.

12. A process for reforming in accordance with claim 1 wherein the silicalite crystals are grown in the presence of platinum.

13. A process in accordance with claim 12 wherein said platinum is from 0.1 to 5.0 wt % of said catalyst.

14. A process in accordance with claim 12 wherein said platinum is from 0.3 to 2.5 wt % of said catalyst.

15. A process in accordance with claim 1 wherein said molar ratio of added hydrogen to hydrocarbons in said feedstream is from about 0.2 to about 1.0.

16. A process in accordance with claim 11 wherein said molar ratio of added hydrogen to hydrocarbons in said feedstream is about zero.

17. A process in accordance with claim 11 wherein the hydrocarbon feedstream is at a pressure of from about 25 psig to about 75 psig.

18. A process in accordance with claim 1 wherein said hydrocarbon feedstream is at a temperature of from about 644° to about 1004° F.

19. A process for reforming in accordance with claim 1 wherein the catalyst further comprises a promoter metal selected from the group consisting of rhenium, tin, gold, and chromium.

20. A process in accordance with claim 19 wherein said promoter metal is from about 0.1 to about 1.0 wt % of said catalyst.

21. A process for reforming in accordance with claim 1 wherein the hydrocarbon feedstream has less than 1 ppm sulfur.

22. A process for reforming in accordance with claim 1 wherein the silica to alumina molar ratio of the catalyst is at least 2000:1.

23. A process in accordance with claim 1 where at least about 90 wt % of said silica crystallites are of a size less than about 5 microns.

24. A process in accordance with claim 11 wherein at least about 90 wt % of said silica crystallites are of a size less than about 2 microns.

25. A process as set forth in claim 1 wherein said contracting is carried on under conditions selected to maintain an n-$C_6$ aromatization conversion of at least 60% for a period of time of greater than 50 hours.

* * * * *